United States Patent Office 2,824,502
Patented Feb. 25, 1958

2,824,502

HIGHWAY MARKING COMPOSITION CONTAINING GLASS BEADS AND PROCESS FOR MAKING AND USING SAME

Donald M. Rockwell and William D. Joseph, Huntingdon, Pa., assignors to Prismo Safety Corporation, Huntingdon, Pa., a corporation of Pennsylvania No Drawing. Application September 15, 1954
Serial No. 456,328

13 Claims. (Cl. 94—22)

This invention relates to a highway marking paint adapted to be applied on highway surfaces to provide a durable light-reflective marking which has a high nighttime visibility to motorists and, more particularly, to such a paint having small transparent glass spheres incorporated therein and which becomes almost instantly free of surface tackiness when applied to the highway surface.

In areas where traffic markings are subjected to heavy abrasive wear, the usual highway marking paints are not satisfactory because of the necessity for frequent replacement. This is not only expensive, but also interferes with the flow of traffic during replacement of the markings. In the past, these difficulties have been partially met by the use of preformed marking devices which may be quickly applied to the pavement surface by means of suitable adhesives or other means and which are of sufficient thickness and durability to withstand long periods of abrasive wear. Such markings may be applied rapidly, however, they do not lend themselves readily to the production of continuous stripes. Moreover, those which depend upon the use of adhesives are subject to displacement or loss due to the failure of the adhesives under the conditions of traffic and weathering.

The use of self adhesive plastic materials, which may be applied in thick continuous stripes, has been previously proposed; however, experience has shown that these materials retain a considerable degree of tackiness during the first few hours after their application. Consequently, in areas of heavy traffic, such material picks up a large amount of dirt which soon renders it of little value as a visible traffic safety marking. Moreover, this material does not possess the property of retroreflectivity which has become accepted as a valuable adjunct to traffic safety markings.

It is an object of the present invention to provide a new traffic marking material which may be quickly applied as a continuous stripe and which becomes almost instantly free of surface tackiness.

It is a further object of the present invention to provide an improved traffic marking material which may be applied in the form of a heated readily flowable plastic which instantly adheres to the subsurface and which, on application, becomes almost instantly free of surface tackiness.

It is a still further object of the present invention to provide a marking material which may be applied in heated form to a subsurface to form a wear-resistant coating containing glass beads which instantly becomes almost free of surface tackiness.

In accordance with the present invention, a traffic marking material containing glass spheres is applied to a highway surface as a continuous stripe, by heating the material to a readily flowable plastic which adheres to the subsurface, becomes free of surface tackiness almost immediately, and becomes hardened in a few hours to withstand the passage of heavy traffic. The marking material is a combination of alkyd resins and chlorinated rubber to which is added suitable pigments, fillers, flow improvers, driers, and aggregate.

The following specific examples are preferred embodiments of the invention and are set forth for purposes of illustration rather than limitation:

*Example I*

Components A—50% by weight of mixture:

| | Parts by weight |
|---|---|
| Alkyd resin | 2 |
| Chlorinated rubber | 1 |
| Pigment and small amounts of dispersing agent flow improver drier | 3½ |

Components B—50% by weight of mixture:

| | Percent by weight |
|---|---|
| Silica sand | 50 |
| Glass spheres | 50 |

Components A are combined and passed once over a 3-roll mill to form a smooth heavy paste. Components B are then incorporated by stirring them into the paste which has been heated to approximately 175° F. to lower its viscosity. The resulting mixture can then be cooled for storage in covered containers.

When it is desired to use the material, its temperature is raised to approximately 250° F. in a dispensing device from which it is directly applied to the roadway in the form of a stripe of the desired thickness by means of a doctor blade or other device. If, during the heating, the consistency becomes too thick because of loss of solvent, it may be restored by addition of toluene or xylene to the degree of flowability desired.

When applied at a temperature of approximately 250° F. to the highway or other surface, this material adheres well and within twenty seconds of the time of application the exposed surface becomes tacky-free. As the material cools, it gradually hardens to a firm abrasion and weather-resistant film which will admit traffic after approximately two hours. The time required for set-up depends upon the thickness of the film; the time listed is characteristic of films approximately 3/32″ thick.

The alkyd resin is preferably an oil modified alkyd resin and may be a mixture of more than one such resin. Typical of such resins are a General Electric product sold as Glyptal #7424, a Rohm and Haas product known as Duraplex D-65-A, General Electric glyptal resins 2585, 2590, 2592 and 2593, and Rezyl 53 sold by American Cyanamid Co. These typical alkyd resins are believed to be made from phthalic anhydride, glycerine and a drying oil or drying oil acid.

The term alkyd resins as used in this specification and claims are compounds of phthalic or other polybasic acid with glycerine or other polyhydric alcohol, and include the modified types which, for example, contain fatty acids either saturated or unsaturated, or which contain natural resin acids or esters.

The chlorinated rubber used may be Hercules Powder Co. Parlon (50% Toluolsol); Pliolite made by Goodyear Tire & Rubber Co. or the equivalent.

The pigments are added to obtain the desired colors and opacity as well as the reflective properties and to improve the abrasion resistance of the material. Titanium dioxide pigment acts as a brilliant white reflective material, and may be used with other pigments or extenders in proper amounts to attain the desired consistency and color. Suitable extenders may be diatomaceous silica, asbestine, bentonite and the like. Mixtures of titanium dioxide with zinc oxide, antimony oxide or the like have been found particularly effective and has the property of minimizing chalking and increased weathering resistance. A colored reflected light can be obtained by substituting colored pigment, such as chrome yellow, for part or all of the white pigment.

To improve flow characteristics of the composition, a material such as an ethylene oxide modified polypropylene glycol, known as Pluronic L-64, manufactured by Wyandotte Chemicals Co., is added. This additive converts the mixture from a pasty, sticky, non-flowing material to a smooth, creamy, flowable material even though of a heavy consistency. It is believed that this effect is due to the surface active properties of the Pluronics, and that similar materials can be substituted.

As dispersing agent, substances similar to lecithin can be used. Typical driers, such as metal naphthenates may be used to aid in curing the resin at lower temperatures and in a shorter time. Typical driers are lead naphthenate, calcium naphthenate, cobalt naphthenate, manganese naphthenate, and mixtures thereof or of metallic linoleates or resinates.

Silica sand and glass spheres are incorporated to improve the abrasion resistance of the material and to render the resultant markings retroreflective after preliminary abrasive wear has exposed their surfaces. If a non-reflective marking is desired, the glass spheres may be replaced with an equal weight of silica sand of similar screen size. The transparent glass beads are small spheres having an average diameter of the order of about 3 to 10 mils.

*Example II*

Components A—50% by weight:

| | Percent by weight |
|---|---|
| Glyptal #7424 | 14 |
| Duraplex D-65-A | 14 |
| Parlon | 16 |
| $TiO_2$ | 42 |
| ZnO | 12.6 |
| Lecithin | 0.7 |
| Pluronic L-64 | 0.5 |
| Lead naphthenate | 0.1 |
| Calcium naphthenate | 0.1 |

Components B—50% by weight:

| | |
|---|---|
| Silica sand | 50 |
| Glass spheres | 50 |

The ingredients are mixed as set forth in Example I.

*Example III*

Components A—50% by weight:
Same as in Example I or II.

Components B—50% by weight:

| | Percent by weight |
|---|---|
| Silica sand | 100 |

The compositions are mixed as in Example I to yield a non-reflective marking.

*Example IV*

Components A—40–60% by weight:

| | Percent by weight |
|---|---|
| Alkyd resin | 15–40 |
| Chlorinated rubber | 20–20 |
| Pigment | 40–75 |
| Dispersing agent | up to 1.5 |
| Flow improver | up to 1 |
| Drier | up to 1 |

Components B—40–60% by weight:

| | |
|---|---|
| Silica sand | 30–100 |
| Glass spheres | up to 70 |

The compositions listed in the examples when heated form a readily flowable plastic which may be applied to the highway surface as a continuous stripe which adheres well and becomes almost instantly free of surface tackiness. This is of great importance in preventing the excessive retention of dirt on the surface of the stripe.

It will be obvious to those skilled in the art that various changes may be made without departing from the spirit of the invention and therefore the invention is not limited to what is described in the specification but only as indicated in the appended claims.

What is claimed is:

1. A reflective highway marking paint composition essentially comprising a mixture of at least one alkyd resin, said alkyd resin being a glycerol phthalate resin, and chlorinated rubber, the amount of said resin being approximately twice the amount of said rubber, to which is added ethylene oxide modified polypropylene glycol, a pigment, and small transparent glass beads, said composition when heated forming a readily flowable plastic and when cold being too thick for application as a paint.

2. A highway marking paint composition essentially comprising a mixture of at least one alkyd resin, said alkyd resin being a glycerol phthalate resin, and chlorinated rubber, the amount of said resin being approximately twice the amount of said rubber, to which is added ethylene oxide modified polypropylene glycol, pigment and silica sand, said composition when heated forming a readily flowable plastic and when cold being too thick for application as a paint.

3. A reflective highway marking paint composition essentially comprising a mixture of at least one alkyd resin, said alkyd resin being a glycerol phthalate resin, and chlorinated rubber, the amount of said resin being approximately twice the amount of said rubber, to which is added pigment, lecithin, an ethylene oxide modified polypropylene glycol, a filler, a metal naphthenate drier, and small transparent glass beads, said composition when heated forming a readily flowable plastic and when cold being too thick for application as a paint.

4. A reflective highway marking paint composition essentially comprising at least one alkyd resin, said alkyd resin being a glycerol phthalate resin, a chlorinated rubber, pigment, silica sand, small transparent glass beads and less than 3.5% of the composition of lecithin, an ethylene oxide modified polypropylene glycol, and at least one metal naphthenate drier, the amount of said resin being approximately twice the amount of said rubber, said composition when heated forming a readily flowable plastic and when cold being too thick for application as a paint.

5. A reflective highway marking paint composition which includes at least one alkyd resin, said alkyd resin being a glycerol phthalate resin, a chlorinated rubber, and pigment containing a small amount of an ethylene oxide modified polypropylene glycol as a flow improver, the amount of said resin being approximately twice the amount of said rubber, said composition when heated forming a readily flowable plastic and when cold being too thick for application as a paint.

6. A reflective highway marking paint composition essentially comprising equal parts of a mixture of silica sand and small transparent glass beads and a mixture of alkyd resin, said alkyd resin being a glycerol phthalate resin, chlorinated rubber, 0.5 to 1% of ethylene oxide modified polypropylene glycol, and pigment, the amount of said resin being approximately twice the amount of said rubber, said composition when heated forming a readily flowable plastic and when cold being too thick for application as a paint.

7. A highway marking paint composition essentially comprising equal parts of silica sand and a mixture of alkyd resin, said alkyd resin being a glycerol phthalate resin, chlorinated rubber, 0.5 to 1% of ethylene oxide modified polypropylene glycol, and pigment, the amount of said resin being approximately twice the amount of said rubber, said composition when heated forming a readily flowable plastic and when cold being too thick for application as a paint.

8. A reflective highway marking paint composition essentially comprising equal parts of a mixture of

|  | Percent by weight |
|---|---|
| Silica sand | 30–100 |
| Small transparent glass spheres | up to 70 | and a mixture of

|  | Percent by weight |
|---|---|
| Glycerol phthalate alkyd resin | 15–40 |
| Chlorinated rubber | 10–20 |
| Pigment | 40–75 |
| Lecithin | up to 1.5 |
| Ethylene oxide modified propylene glycol | up to 1 |
| Metal naphthenate drier | up to 1 | said composition when heated forming a readily flowable plastic and when cold being too thick for application as a paint.

9. The method of preparing a reflective highway marking composition which comprises combining essentially a mixture of at least one alkyd resin, said alkyd resin being a glycerol phthalate resin, chlorinated rubber, ethylene oxide modified polypropylene glycol, and pigment by passing through a mill, stirring to form a smooth, heavy paste, adding approximately an equal weight of a mixture of silica sand and small glass spheres, heating to approximately 175° F. while stirring, and then cooling, the amount of said resin being approximately twice the amount of said rubber, said composition when heated forming a readily flowable plastic and when cold being too thick for application as a paint.

10. The method of applying a reflective highway marking composition which comprises heating the composition made in accordance with claim 9 to a temperature of approximately 250° F. and applying the hot material in the form of a stripe of the desired thickness directly onto the highway without dissolving in a solvent.

11. The method of preparing a highway marking composition which comprises combining essentially a mixture of at least one alkyd resin, said alkyd resin being a glycerol phthalate resin, chlorinated rubber, the amount of said resin being approximately twice the amount of said rubber, pigment, metal naphthenate drier and ethylene oxide modified polypropylene glycol by passing through a ball mill, stirring to form a smooth, heavy paste, adding approximately an equal weight of silica sand, and heating to approximately 175° F. while stirring.

12. The method of applying a highway marking composition which comprises heating the composition made in accordance with claim 11 to a temperature of approximately 250° F. and applying the hot material in the form of a stripe of the desired thickness directly onto the highway without dissolving in a solvent.

13. The method of applying a reflective highway composition which comprises heating to approximately 250° F., a composition comprising a mixture of at least one alkyd resin and chlorinated rubber, said alkyd resin being a glycerol phthalate resin, the amount of said resin being approximately twice the amount of said rubber, to which is added pigment, ethylene oxide modified polypropylene glycol, and small transparent glass beads, and applying the hot material in the form of a stripe of the desired thickness directly onto the highway.

References Cited in the file of this patent

UNITED STATES PATENTS

| 1,831,555 | Earl | Nov. 10, 1931 |
| 2,085,778 | Winkelmann | July 6, 1937 |
| 2,179,980 | Michaelis | Nov. 14, 1939 |
| 2,574,971 | Heltzer | Nov. 13, 1951 |